(12) United States Patent
Smyczynski et al.

(10) Patent No.: US 10,899,351 B2
(45) Date of Patent: Jan. 26, 2021

(54) HYBRID POWERTRAIN SYSTEM AND OPERATION WITH TRANSFER CASE IN LOW GEAR

(71) Applicants: Robert S Smyczynski, Clarkston, MI (US); Nadirsh Patel, Farmington Hills, MI (US); Stefan Senft, Essen (DE)

(72) Inventors: Robert S Smyczynski, Clarkston, MI (US); Nadirsh Patel, Farmington Hills, MI (US); Stefan Senft, Essen (DE)

(73) Assignee: FCA US LLC, Auburn Hills, MI (US)

( * ) Notice: Subject to any disclaimer, the term of this patent is extended or adjusted under 35 U.S.C. 154(b) by 94 days.

(21) Appl. No.: 16/190,514

(22) Filed: Nov. 14, 2018

(65) Prior Publication Data

US 2019/0152480 A1 May 23, 2019

Related U.S. Application Data

(60) Provisional application No. 62/587,907, filed on Nov. 17, 2017.

(51) Int. Cl.
*B60W 30/18* (2012.01)
*B60W 10/119* (2012.01)
(Continued)

(52) U.S. Cl.
CPC ....... *B60W 30/18063* (2013.01); *B60K 6/387* (2013.01); *B60K 6/547* (2013.01);
(Continued)

(58) Field of Classification Search
CPC ..... B60W 30/18063; B60W 30/18027; B60W 10/119; B60W 20/40; B60W 10/115;
(Continued)

(56) References Cited

U.S. PATENT DOCUMENTS 5,839,084 A 11/1998 Takasaki et al.
9,115,803 B2 8/2015 Fujii et al.
(Continued)

FOREIGN PATENT DOCUMENTS

DE 102013213145 A1 1/2015
DE 102014214543 A1 * 1/2016 ............ B60W 10/08
(Continued)

OTHER PUBLICATIONS

English Translation_DE102014214543A1 (Year: 2014).*
(Continued)

*Primary Examiner* — Peter D Nolan
*Assistant Examiner* — Ashley L Redhead, Jr.
(74) *Attorney, Agent, or Firm* — Ralph E Smith (57) ABSTRACT

A hybrid powertrain includes a torque provider, an automatic transmission without a torque converter, and a transfer case configured for providing four wheel drive low range. A controller receives a signal indicative of the transfer case being in low range and determines if brake pedal torque is indicative of a brake pedal being released and, if so, commands engagement of a launch clutch of the transmission up to maximum creep torque capacity at a predetermined maximum gradient. The controller determines when torque provider speed is synchronized with vehicle creep speed, and upon such determination, controls the launch clutch to fully engage to a lock up state to mimic behavior of engagement of a manual transmission gear when the hybrid powertrain is in low range to thereby substantially eliminate a time lag associated with automatic transmissions having a torque converter or a constantly slipping launch clutch.

13 Claims, 6 Drawing Sheets

(51) Int. Cl.
| | |
|---|---|
| *B60K 6/387* | (2007.10) |
| *B60W 10/02* | (2006.01) |
| *B60W 20/40* | (2016.01) |
| *B60K 6/547* | (2007.10) |
| *B60W 10/115* | (2012.01) |
| *B60W 10/111* | (2012.01) |
| *B60W 20/15* | (2016.01) |
| *B60W 10/06* | (2006.01) |
| *B60W 10/08* | (2006.01) |
| B60K 6/48 | (2007.10) |

(52) U.S. Cl.
CPC .......... *B60W 10/02* (2013.01); *B60W 10/06* (2013.01); *B60W 10/08* (2013.01); *B60W 10/111* (2013.01); *B60W 10/115* (2013.01); *B60W 10/119* (2013.01); *B60W 20/15* (2016.01); *B60W 20/40* (2013.01); *B60W 30/18027* (2013.01); B60K 2006/4825 (2013.01); B60W 2300/18 (2013.01); B60W 2510/0241 (2013.01); B60W 2510/0638 (2013.01); B60W 2510/081 (2013.01); B60W 2510/1005 (2013.01); B60W 2520/10 (2013.01); B60W 2540/10 (2013.01); B60W 2540/12 (2013.01); B60W 2710/021 (2013.01); B60W 2710/023 (2013.01); B60W 2710/027 (2013.01); B60W 2710/0644 (2013.01); B60W 2710/0666 (2013.01); B60W 2710/083 (2013.01); B60W 2710/1005 (2013.01); B60W 2720/10 (2013.01); B60Y 2200/92 (2013.01)

(58) Field of Classification Search
CPC .... B60W 10/111; B60W 20/15; B60W 10/02; B60W 10/06; B60W 10/08; B60W 2710/1005; B60W 2710/023; B60W 2710/0644; B60W 2300/18; B60W 2510/0241; B60W 2510/0638; B60W 2510/081; B60W 2510/1005; B60W 2520/10; B60W 2540/10; B60W 2540/12; B60W 2710/021; B60W 2710/027; B60W 2710/0666; B60W 2710/083; B60W 2720/10; B60K 6/547; B60K 6/387; B60K 2006/4825; B60Y 2200/92

See application file for complete search history.

(56) References Cited

U.S. PATENT DOCUMENTS

| | | | |
|---|---|---|---|
| 2007/0034428 A1* | 2/2007 | Janson | B60K 6/365 180/65.235 |
| 2012/0083958 A1 | 4/2012 | Ballard | |
| 2012/0238404 A1 | 9/2012 | Schiele et al. | |
| 2014/0228168 A1* | 8/2014 | Kaufman | B60W 20/13 477/5 |
| 2016/0339779 A1 | 11/2016 | Lauffer et al. | |
| 2017/0203760 A1 | 7/2017 | Sowards et al. | |
| 2018/0236866 A1* | 8/2018 | Paterno | B60W 10/08 |

FOREIGN PATENT DOCUMENTS

| | | |
|---|---|---|
| DE | 102014214543 A1 | 1/2016 |
| JP | 2012106711 A * | 6/2012 |
| WO | 2012044881 A2 | 4/2012 |

OTHER PUBLICATIONS

English Translation_JP2012106711A (Year: 2012).*
International Search Report and Written Opinion dated Feb. 27, 2019 for International Application No. PCT/US2018/061427, International Filing Date Nov. 16, 2018.

* cited by examiner

HYBRID POWERTRAIN SYSTEM AND OPERATION WITH TRANSFER CASE IN LOW GEAR

CROSS-REFERENCE TO RELATED APPLICATION(S)

The present application claims the benefit of U.S. Provisional Application No. 62/587,907, filed on Nov. 17, 2017. The disclosure of this application is incorporated herein by reference in its entirety.

FIELD

The present application relates generally to a hybrid powertrain for a motor vehicle and, more particularly, to a hybrid powertrain that includes a transfer case where behavior of the powertrain mimics that of a manual transmission in low gear or low range.

BACKGROUND

Today's vehicles are often equipped with automatic transmissions. Many new vehicles often do not include an option for a manual transmission, especially where a hybrid automatic transmission is offered on such new vehicles. In some vehicle driving scenarios, such as low speed off-road driving and/or rock crawling (e.g., in low range), customers often prefer manual transmissions due to the greater control and less time lag such transmissions are known to provide in connection with transmission gear shifting, as compared to conventional automatic and hybrid automatic transmissions. Sport utility and other vehicles that may be utilized in such an off-road driving scenario are often also utilized on-road and these vehicles may not be provided with an optional manual transmission and/or the customers may not want a manual transmission because the vehicle may be primarily driven on-road. Thus, while today's manual and automatic and hybrid automatic transmissions do work well for their intended purposes, there remains a need for improvement in the art of automatic and hybrid automatic transmissions, namely to provide, for example, the benefits discussed above for manual transmissions.

SUMMARY

According to one example aspect of the invention, a hybrid powertrain system of a vehicle is provided. In one example implementation, the hybrid powertrain system includes a torque provider for providing drive torque to wheels of the vehicle; a hybrid automatic transmission including a launch clutch and an electric motor capable of providing drive torque to the wheels, where the hybrid powertrain is free of any torque converter; a transfer case configured to be selectively activated to provide four wheel drive low range gear selection; and a control system configured to control the hybrid powertrain such that the hybrid automatic transmission operates like a manual transmission. In an implementation, the controller system is configured to: receive a signal indicative of the transfer case being in four wheel drive low range; based on the signal, determine if brake pedal torque is less than a threshold indicative of a brake pedal being released; command engagement of the launch clutch of the transmission up to maximum creep torque capacity at a predetermined maximum gradient based on determining the brake pedal torque is less than the threshold; determine when the torque provider speed is synchronized with vehicle creep speed; and upon such determination, control the launch clutch to fully engage to a lock up state to mimic a behavior of engagement of a manual transmission gear when the hybrid powertrain is in low range to thereby at least substantially eliminate a time lag associated with automatic transmissions having a torque converter or a constantly slipping launch clutch.

In some implementations, commanding engagement of the launch clutch of the transmission up to maximum creep torque capacity at the predetermined maximum gradient is based solely on determining the brake pedal torque is less than the threshold.

In some implementations, determining when the torque provider speed is synchronized with vehicle creep speed includes determining when a slipping speed of the launch clutch is at least substantially equal to the vehicle creep speed.

In some implementations, the torque provider is an internal combustion engine coupled to the hybrid automatic transmission. In some implementations, the torque provider is the electric motor.

In some implementations, the predetermined maximum gradient for ramping up engagement of the launch clutch to maximum creep torque is calibrated to mimic the rate of gear engagement of a selected gear of a manual transmission when an associated clutch pedal is released.

In some implementations, the hybrid automatic transmission requires engagement of three clutches to establish powerflow, and wherein when the vehicle is at rest and the transmission is in drive gear, two of the three clutches are controlled to be fully engaged and the third clutch is the launch clutch, which is controlled to be at a touch point before the brake pedal torque is less than the threshold.

In some implementations, engagement of the launch clutch at maximum creep torque capacity is maintained independent of vehicle speed until the torque provider speed is determined to be at least substantially equal to vehicle speed, then the torque capacity of the launch clutch will only be increased.

In some implementations, a disengage speed to open the launch clutch is below vehicle creep speed and is free from being a function of a position of an accelerator pedal of the vehicle.

In some implementations, the maximum creep torque is a function of brake torque only, and is free of being a function of slip across the launch clutch.

Further areas of applicability of the teachings of the present application will become apparent from the description and the drawings provided hereinafter. It should be understood that the description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
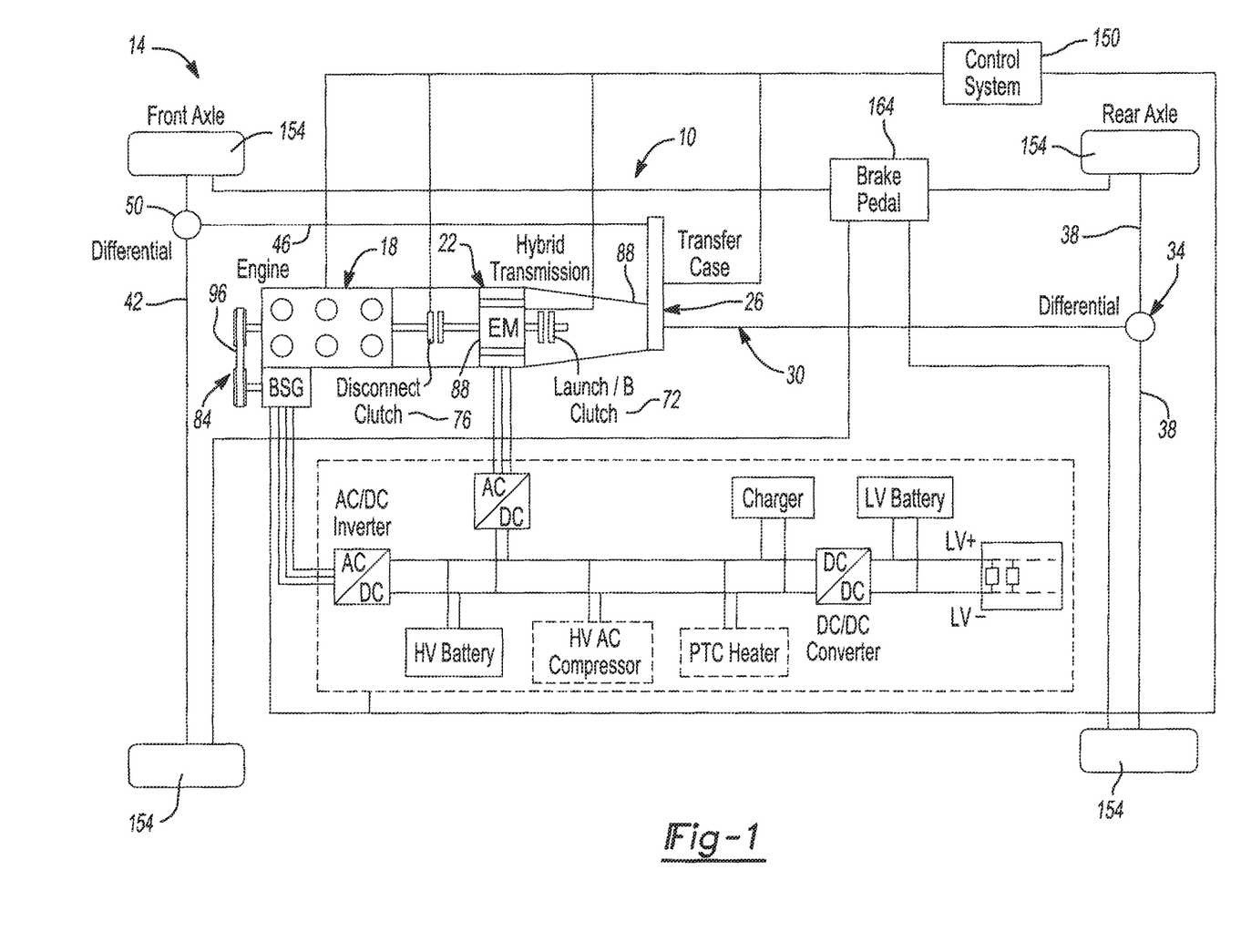
FIG. 1 is schematic illustration of an example implementation of a hybrid powertrain including a hybrid automatic transmission and a transfer case in accordance with the principles of the present application.

In accordance with an example aspect of the invention and as will be discussed in greater detail herein, the hybrid powertrain 10 of vehicle 14 includes an engine or prime mover 18, a hybrid automatic transmission assembly 22, a transfer case 26 for providing low gear or low range in four wheel drive (e.g., for off-road situations), and a driveline 30 including a final drive unit 34 and associated rear axles 38, as generally shown in FIG. 1. The transfer case is selectively coupled to a front axle 42 via a front drive shaft 46 and a front drive unit or differential 50, as also shown in FIG. 1.

In this exemplary implementation, the hybrid powertrain architecture 10 may be referred to as a "P1f/P2", "P0/P2", and/or "P1/P2" type powertrain architecture. In one exemplary implementation, the hybrid powertrain architecture includes an input shaft 60, a damper system 64, separate launch and disconnect clutches 72, 76, a first electric machine (P1f) arrangement/assembly 84, and a second electric machine (P2) arrangement/assembly 88. It will be appreciated by those skilled in the art that the hybrid powertrain includes other features and components for use in its overall operation. It will also be appreciated that the control system and methodology of the present application could also be applied to other architectures, including a "P1r/P2" architecture.

In the exemplary implementation illustrated in FIG. 1, the P1f 84 is coupled to the front of the engine 18 via a belt 96, such as in the illustrated belt-starter-generator (BSG) system. The engine 18 and P1f 84 can be selectively connected/disconnected to the powertrain with the separate disconnect clutch 76. For launch maneuvers, clutch B/72 inside the transmission 22 serves as the launch clutch. As will be discussed below, the launch clutch is clutch "B"/72 in the physical transmission of FIGS. 1 and 2, but for modeling and calibration purposes, the clutch is referred to or visualized as a virtual launch clutch (ILE). In the physical transmission, the functionality of the virtual ILE clutch is handled by physical clutch B. In general terms, the P2 88 in connection with launch clutch B/72 handle the functionality of a torque converter of a conventional automatic transmission and are thus calibrated/modeled as such, noting that the hybrid powertrain of this application does not include a torque converter.

Figure 2:
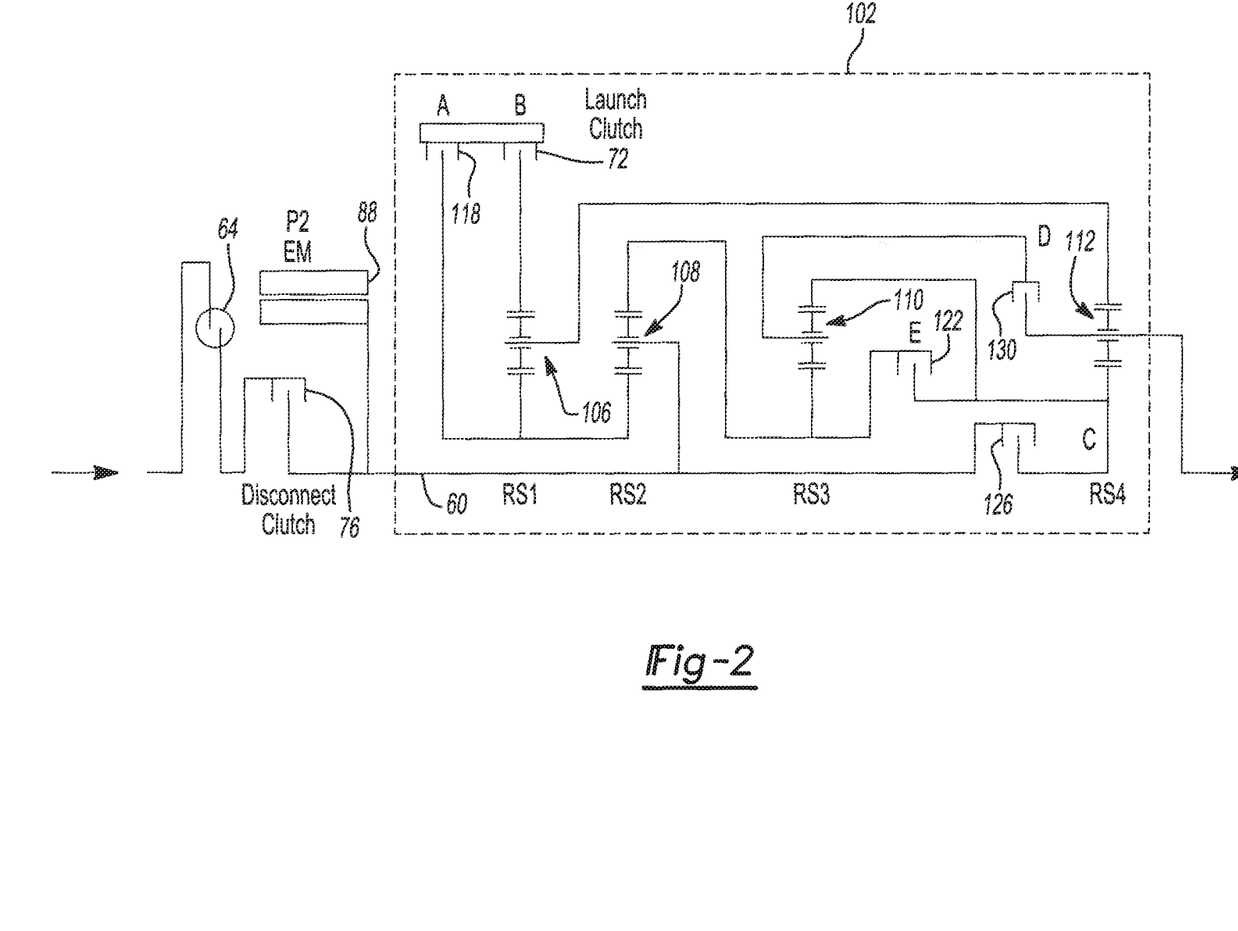
FIG. 2 is an example schematic illustration of the hybrid automatic transmission of FIG. 1 in accordance with the principles of the present application.

In the exemplary implementation illustrated in FIG. 2, the hybrid automatic transmission assembly 22 includes 8 forward speeds/gears and reverse, and is configured for a four wheel drive/rear wheel drive vehicle configuration. The hybrid automatic transmission 22 and engine arrangement 18 is configured to operate in various modes, including, but not limited to, EV, engine on and hybrid. While an 8 speed transmission is shown, it will be appreciated by those skilled in the art that the hybrid automatic transmission assembly could include more or less forward speeds, such as six forward speeds.

In the exemplary implementation illustrated in FIG. 2, the P2 electric machine 88 is coupled to the input shaft 60 of the transmission downstream of the disconnect clutch 76 and upstream of the launch clutch 72 and the transmission's gearing in its clutch and gearbox 102. In this implementation, the P2 electric machine 88 is directly coupled to the input shaft 60 for common rotation therewith, noting that other arrangements are possible and within the scope of this disclosure.

The clutch and gearbox system 102 includes, in one exemplary implementation, four planetary gear sets 106, 108, 110, 112, two brake clutches 72, 118 and three rotating clutches 122, 126, 130. In one exemplary implementation, the four planetary gear sets 106, 108, 110, 112 are separate, simple planetary gear sets arranged generally spaced apart from each other along a longitudinal length of the hybrid automatic transmission 22. Input (e.g., torque) to the hybrid automatic transmission 22 from the engine or prime mover 18 flows through the damper 64 and then, in one exemplary implementation, directly to the disconnect clutch 76. The input shaft 60 then, in one exemplary implementation, connects the separate disconnect clutch 76 to the clutch and gearbox arrangement 102, as shown, for example, in FIG. 2.

The disconnect and launch clutches 76, 72 are now discussed in connection with general operation of the hybrid automatic transmission assembly 22. In one exemplary implementation and as briefly discussed above, the launch clutch 72 (B clutch) and the disconnect clutch 76 are separate clutches, controlled by a control system or controller 150 or the like. In the exemplary implementation illustrated in the various Figures, the control system 150 can include one or more controllers or the like, such as a transmission controller, and engine controller and a battery system controller; or the control system can include one overall powertrain controller 150, as is shown in the example implementation in FIG. 1. As is known in the art, the controller 150 is configured to both receive information in the form of inputs and issue output commands to the various components it is in signal communication with, and includes memory, a processor and a communication module.

The disconnect clutch 76 is configured to be controlled to selectively engage and disengage the engine 18 and P1F electric machine 88 from the transmission assembly 22. The disconnect clutch 76 may also be utilized for improved noise vibration and harshness (NVH). For example, the disconnect clutch 76 may be controlled to be slipped, as needed, to mitigate NVH inputs, such as during an electric vehicle (EV) mode. The launch clutch 72 is a separate and separately selectively engageable clutch from the disconnect clutch 76 and is controlled to provide for, among other modes and control features, tractive effort to the wheels 154 of vehicle 14.

In the example hybrid transmission illustrated in FIG. 2, three clutches are required to be engaged to provide powerflow through the transmission. In one example, when the transmission is in drive and first gear is desired, clutches 72, 118 and 126 are utilized to provide powerflow, where clutches A and C are fully engaged before the driver releases the brake pedal 164, and clutch B (launch clutch) is at a kiss or touch point before the driver releases the brake pedal 164.

Figure 4A:
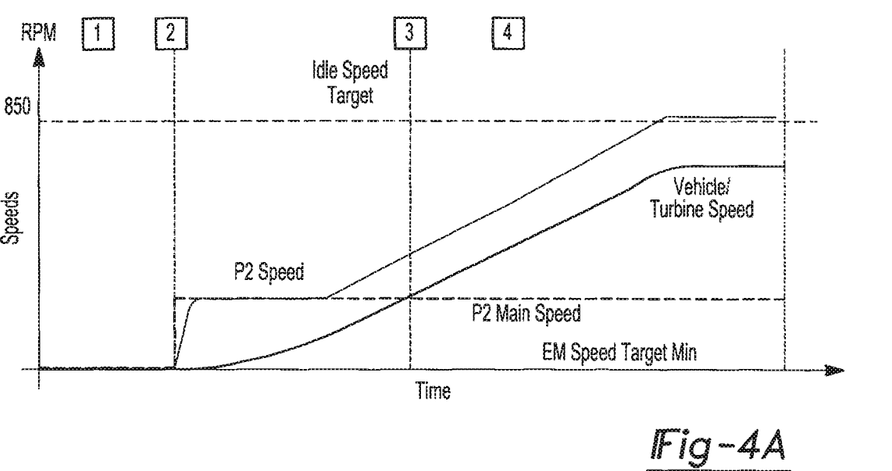
FIGS. 4A-4C illustrate operating and control status characteristics of a conventional hybrid automatic powertrain controlled in a conventional manner in an EV mode from an EV creep slip through point 4 of the charts of FIGS. 3A-3C, noting that FIGS. 3A-3C and FIGS. 4A-4C illustrate an EV mode for simplicity and the general functionality provided is also applicable to other hybrid and engine only modes.
Figure 4B:
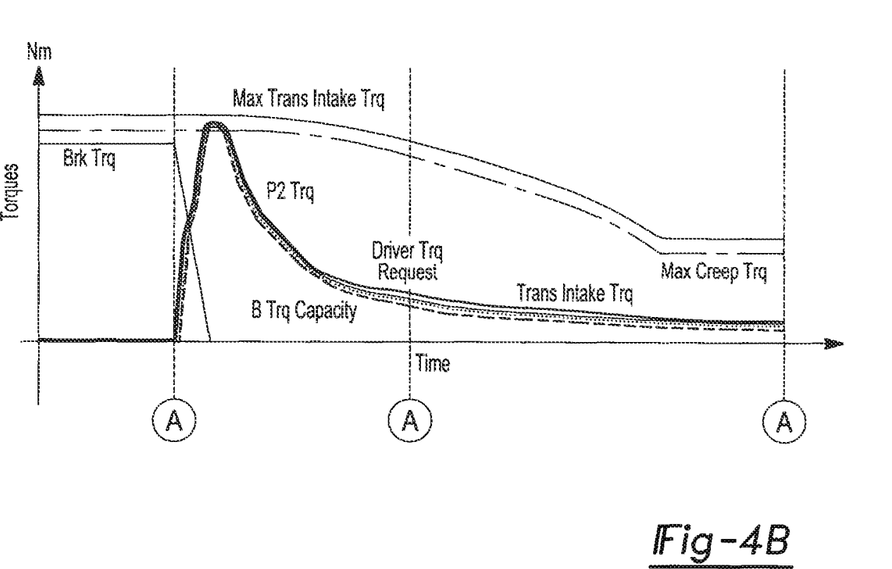
Figure 4C:
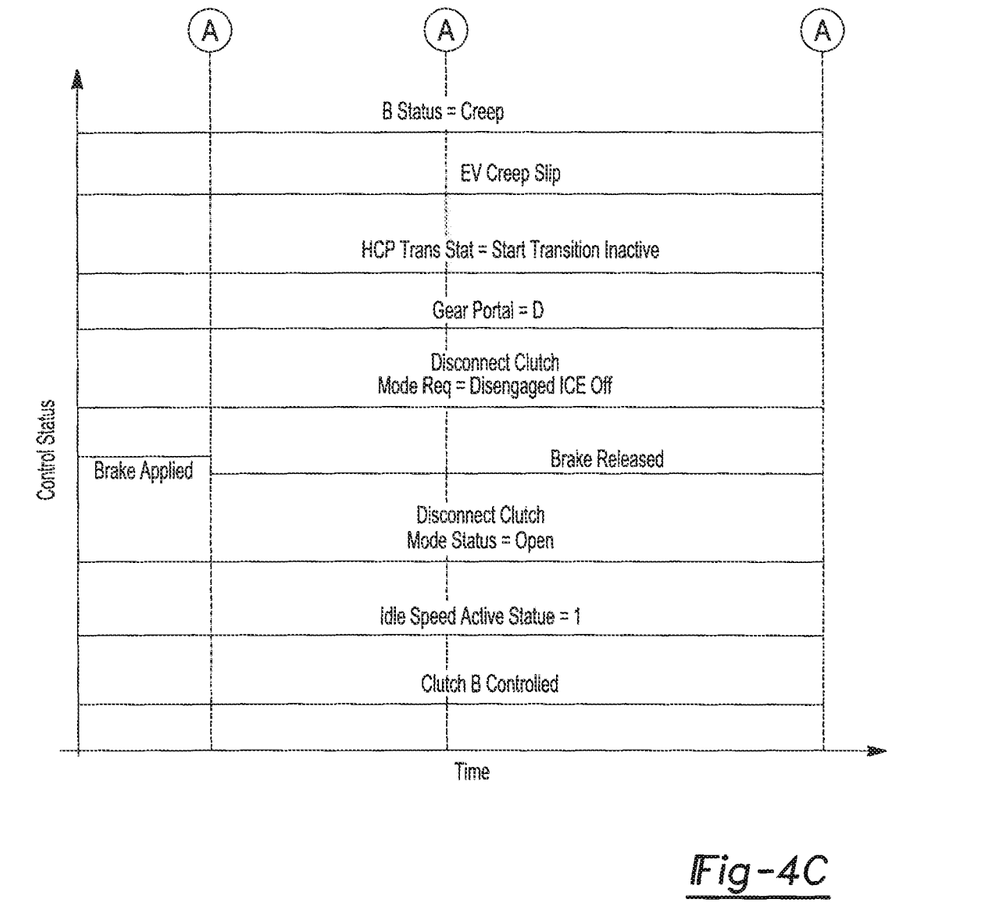

As briefly mentioned above, during normal driving operation of the vehicle 14 (e.g., high gears where the transfer case 26 is not utilized to provide low gear or low range), the hybrid powertrain 10 operates or behaves like a vehicle with a torque converter, whose functionality is mimicked by the ILE or B clutch 72. This means that i) the creep torque (no pedal input but 140 released) of the ILE or B clutch is reduced as a function of slip across the ILE or B clutch; ii) there is a steady state creep slip state; iii) the transmission controller controls the ILE or B clutch during creep to follow a target hypothetical turbine speed profile; and iv) at accelerator pedal tip-ins, a relaunch (going back from a locked state of the ILE clutch to a slipping state) is executed to allow the engine to provide more torque. See, in general, FIGS. 4A-4C.

However, when the transfer case 26 is utilized to provide to provide a low gear or low range, the hybrid powertrain 10 is controlled by controller 150 to behave or mimic a vehicle with a manual transmission as opposed to the high gear operation discussed above. This includes, in one exemplary implementation, using existing hardware in a different manner to provide a manual transmission feel/behavior when in low gear (i.e., when the driver selects 4-Wheel-Lo transfer case setting).

In one exemplary implementation, this is accomplished by, for example, having the clutch pedal functionality of a manual transmission be provided to the driver/operator of vehicle 14 via brake pedal 164. In this exemplary implementation, this clutch pedal functionality is provided to the driver solely via/based on the brake pedal 164. For example, as brake pressure generated by application of the brake pedal 164 decreases, the ILE clutch (or clutch B in the physical transmission) 72 torque increases (i.e., less slip). In other words, clutch B (launch clutch) 72 engagement/torque transmission is a function of brake pressure and thus brake pedal 164 position.

In one example implementation, with the controller 150 determining the transfer case is in low gear or range and when the driver releases the brake pedal 164, the transmission controller 150 ramps up the ILE clutch or clutch B 72 torque capacity (e.g., more engagement) with the sole target of locking up the clutch, i.e., ramping up to maximum allowed creep torque as soon as possible (e.g., predetermined maximum gradient) and staying there once the driver releases the brake pedal 164. For this discussion, creep torque (engine/prime mover or other torque provider on, no accelerator pedal input, brake pedal 164 released) is the torque transferred across the ILE clutch or clutch B at vehicle creep speeds. Maximum creep torque is thus less than the maximum torque capacity of the clutch when fully engaged or locked up. Creep torque is sometimes referred to as engine idle speed torque to move the vehicle at idle speed in drive. Creep speed would then be vehicle idle speed, or can be slower in off road driving.

Once the driver releases the brake pedal 164, the transmission controller 150 will ramp up clutch B 72 torque to maximum allowed creep torque as soon as possible and then stay there (like a manual transmission) independent of vehicle speed and within the parameters of low gear operation. This action mimics the release of a clutch pedal in a manual transmission vehicle, i.e., the clutch pedal is typically quickly released and the selected gear is correspondingly quickly engaged. Here, the driver can quickly release the brake pedal 164 and then the transmission control system (mimicking manual transmission operation) will correspondingly quickly engage the associated gear, much faster and with more control than a conventional automatic or hybrid automatic transmission due to known lag times associated with the torque converter.

The transmission controller will then wait until a vehicle speed signal is received indicative of the vehicle speed (e.g., slipping speed of clutch B) reaching engine or P2 speed at creep speed or idle speed or slightly below, to go into overpressure and lock clutch B.

In this operating scenario, the maximum creep torque is not a function of slip across the ILE clutch or clutch B 72 as in the conventional transmission operation, rather it is a function of brake pressure/torque only. Maximum creep torque will be maintained and will ramp down as a function of brake pressure once the brake pedal 164 is depressed. The ILE clutch or clutch B is locked as the virtual turbine speed (ILE clutch) or clutch B speed reaches the idle speed target, noting that as one of ordinary skill in the art will appreciate, clutch B rotational speed corresponds to vehicle speed (and hypothetical turbine speed when referencing FIGS. 3A-3C and 4A-4C. Locking clutch B below idle speed can stall the engine.

In conventional hybrid automatic transmissions, a clutch similar to clutch B is always slipping and does not lock up as it is used (controlled slipping) to control vehicle speed. Thus, there remains a time lag between driver input to the accelerator pedal and transmission reaction, due to the slippingly engaged clutch B, similar to the lag associated with use of a torque converter. Ramping up clutch B torque to maximum creep torque and quickly locking up when vehicle speed equals the torque provider speed mimics the behavior of a manual transmission when the driver releases the clutch, say into first gear.

With clutch B locked, the disengage speed to open the ILE clutch or clutch B, such as due to driver accelerator pedal tip-in, is below the idle speed and is not a function of accelerator pedal position or its equivalent. In conventional hybrid transmission control arrangements, the disengage speed (noting that clutch B would not be locked) is a function of accelerator position, so the control system raises the disengage speed, opens clutch B, increases engine torque to meet demand, and then closes clutch B again. As mentioned above, in conventional hybrid automatic transmissions, a clutch similar to clutch B is always slipping and does not lock up as it is used (controlled slipping) to control vehicle speed.

Figure 3A:
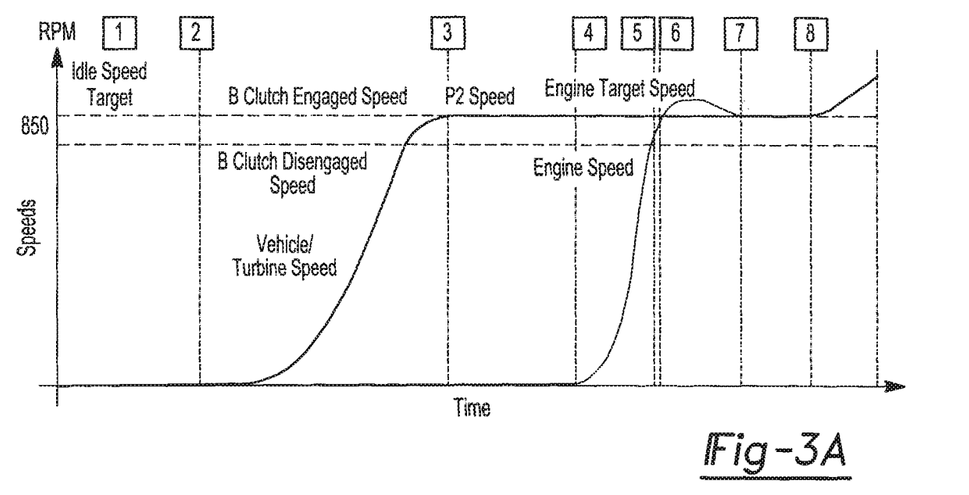
FIGS. 3A-3C illustrate operating and control status characteristics of the hybrid powertrain in electric vehicle (EV) mode from an EV creep slip to an EV creep locked scenario in accordance with the principles of the present application.
Figure 3B:
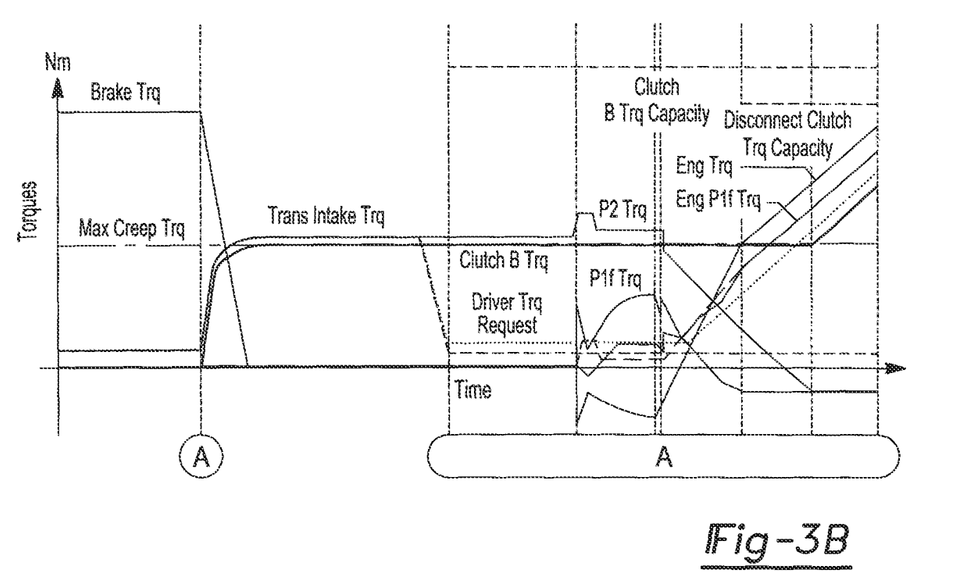
Figure 3C:
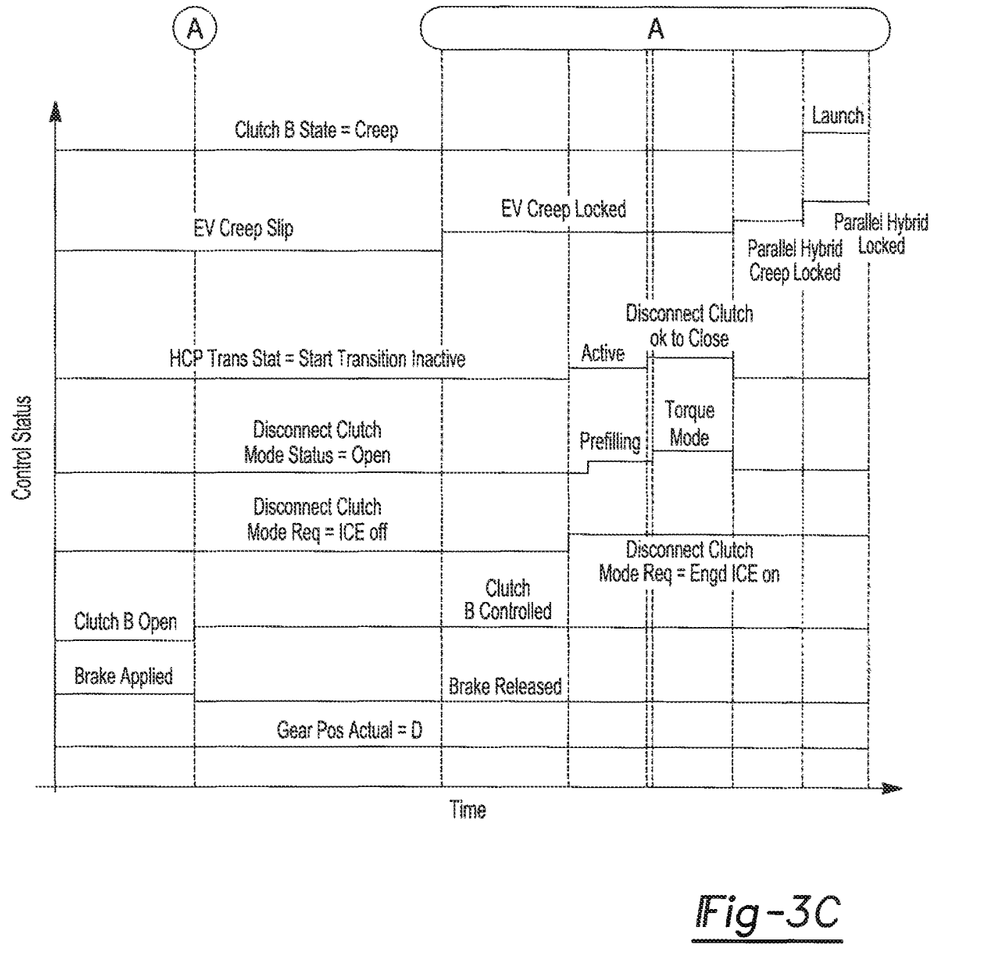

For the control system of the present application, the disengage speed is not a function of accelerator pedal position, rather it is constant and below idle speed by a predetermined offset, as shown in FIGS. 3A-3C. Further, the control system of the present application provides engine stalling protection through use of the disconnect clutch 76, and not the ILE clutch or clutch B, as in conventional hybrid transmissions.

A comparison of the controlled operation/behavior of the transmission of the present application when the vehicle is in low range, which mimics that of a manual transmission, and the controlled operation/behavior of a conventional automatic transmission can be seen in comparing FIGS. 3A-3C to FIG. 4A-4C, respectively. In these Figures, point 1 represents a stop state, point 2 represents a release of the brake, point 3 (not specifically shown in FIGS. 4A-4C) represents where vehicle speed (as indicated by virtual turbine speed) reaches engine speed, and point 4 (not specifically shown in FIGS. 4A-4C) represents start of the engine or prime mover. Again, it is noted that the ILE clutch is physical clutch B in the physical transmission.

The described hybrid powertrain and control system provides a unique feature where an automatic hybrid transmission is controlled to mimic the behavior or a manual transmission when the vehicle and hybrid powertrain are operating in a low gear using the transfer case. This provides for improved feel and controllability in off-road driving scenarios. This control arrangement provides for locking up the launch clutch as soon as possible (mimicking the behavior of a manual transmission), which also provides for reducing the heat generated with conventional hybrid transmission control in low gear. This is because the conventional hybrid transmissions are slipping the launch clutch in most driving situations to mimic the behavior of an automatic transmission with a torque converter, which introduces heat into the system in scenarios with high torque and high slip (e.g., off-road driving scenarios).

The system of the present application further controls locking of the launch clutch as the brake pedal 164 is released, thereby provided for, among other benefits, locking at lower speeds than conventional transmission control systems. Moreover, providing a control arrangement that provides for the vehicle and powertrain to behave like a vehicle with a manual transmission at creep speeds (idle control) provides an improved feel and more control to the driver, especially when navigating off-road driving conditions.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A hybrid powertrain system of a vehicle, the hybrid powertrain system comprising:
   a torque provider for providing drive torque to wheels of the vehicle;
   a hybrid automatic transmission including a launch clutch and an electric motor capable of providing drive torque to the wheels, the hybrid powertrain being free of a torque converter;
   a transfer case configured to be selectively activated to provide four wheel drive low range gear selection; and
   a control system configured to control the hybrid powertrain between (i) a normal driving mode where the hybrid automatic transmission mimics operating behavior of a vehicle with a torque converter, and (ii) a four wheel drive low range mode where the hybrid automatic transmission mimics operating behavior of a manual transmission, the control system configured to:
   operate in the normal driving mode when the transfer case is not in four wheel drive low range; and
   operate in the four wheel drive low range mode when the control system receives a signal indicative of the transfer case being in four wheel drive low range and determines, based on the signal, if brake pedal torque is less than a threshold indicative of a brake pedal being released;
   wherein in the four wheel drive low range mode, the control system is configured to:
   command engagement of the launch clutch up to maximum creep torque capacity at a predetermined maximum gradient based on determining the brake pedal torque is less than the threshold;
   determine when the torque provider speed is synchronized with vehicle creep speed; and
   upon such determination, control the launch clutch to fully engage to a lock up state to mimic a behavior of engagement of a manual transmission gear when the hybrid powertrain is in low range to thereby substantially eliminate a time lag associated with automatic transmissions having a torque converter or a constantly slipping launch clutch.

2. The hybrid powertrain system of claim 1, wherein commanding engagement of the launch clutch up to maximum creep torque capacity at the predetermined maximum gradient is based solely on determining the brake pedal torque is less than the threshold.

3. The hybrid powertrain system of claim 1, further comprising communicating the maximum creep torque as a torque request to one or both of the torque provider and the electric motor to move the vehicle to the vehicle creep speed.

4. The hybrid powertrain system of claim 1, wherein determining when the torque provider speed is synchronized with vehicle creep speed includes determining when a slipping speed of the launch clutch is at least substantially equal to the vehicle creep speed.

5. The hybrid powertrain system of claim 4, wherein the torque provider is an internal combustion engine coupled to the hybrid automatic transmission.

6. The hybrid powertrain system of claim 4, wherein the torque provider is the electric motor.

7. The hybrid powertrain system of claim 1, wherein the predetermined maximum gradient for ramping up engagement of the launch clutch to maximum creep torque is calibrated to mimic the rate of gear engagement of a selected gear of a manual transmission when an associated clutch pedal is released.

8. The hybrid powertrain system of claim 1, wherein the hybrid automatic transmission requires engagement of three clutches to establish powerflow, and wherein when the vehicle is at rest and the transmission is in drive gear, two of the three clutches are controlled to be fully engaged and the third clutch is the launch clutch, which is controlled to be at a touch point before the brake pedal torque is less than the threshold.

9. The hybrid powertrain system of claim 8, wherein the vehicle is initially at rest and the launch clutch is being controlled to engage first gear of the hybrid automatic transmission.

10. The hybrid powertrain system of claim 1, wherein the engagement of the launch clutch at maximum creep torque capacity is maintained independent of vehicle speed until the torque provider speed is determined to be at least substantially equal to the vehicle creep speed, the torque capacity of the launch clutch will only then be increased.

11. The hybrid powertrain system of claim 1, wherein the maximum creep torque is a function of brake torque only, and is free of being a function of slip across the launch clutch, and wherein the launch clutch is engaged to maximum creep torque capacity only when the transfer case is in the four wheel drive low range gear selection.

12. The hybrid powertrain system of claim 1, wherein a disengage speed to open the launch clutch is below vehicle creep speed and is free from being a function of a position of an accelerator pedal of the vehicle.

13. The hybrid powertrain system of claim 1, wherein the vehicle is initially at rest and the hybrid automatic transmission is being controlled to engage first gear.

* * * * *